(12) United States Patent
Chin et al.

(10) Patent No.: US 8,908,648 B2
(45) Date of Patent: Dec. 9, 2014

(54) TDD-LTE MEASUREMENT GAP FOR PERFORMING TD-SCDMA MEASUREMENT

(75) Inventors: Tom Chin, San Diego, CA (US);
Guangming Shi, San Diego, CA (US);
Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 12/977,517

(22) Filed: Dec. 23, 2010

(65) Prior Publication Data

US 2012/0163346 A1    Jun. 28, 2012

(51) Int. Cl.
*H04W 36/30*    (2009.01)
*H04W 36/00*    (2009.01)

(52) U.S. Cl.
CPC ................................ *H04W 36/0088* (2013.01)
USPC .......................................... 370/332; 455/434

(58) Field of Classification Search
None
See application file for complete search history.

(56) References Cited

U.S. PATENT DOCUMENTS

| 8,374,609 B2* | 2/2013 | Somasundaram et al. .... 455/436 |
| 2004/0002334 A1 | 1/2004 | Lee et al. |
| 2007/0037594 A1 | 2/2007 | Palenius et al. |
| 2008/0270619 A1* | 10/2008 | Davies et al. ................. 709/229 |
| 2009/0180435 A1 | 7/2009 | Sarkar |
| 2009/0196197 A1 | 8/2009 | Digirolamo et al. |
| 2009/0274086 A1* | 11/2009 | Petrovic et al. ............... 370/312 |
| 2010/0034126 A1* | 2/2010 | Kitazoe et al. ................ 370/310 |
| 2010/0034158 A1 | 2/2010 | Meylan |
| 2010/0074218 A1* | 3/2010 | Cai et al. ....................... 370/331 |
| 2013/0176997 A1* | 7/2013 | Tian et al. ..................... 370/336 |

FOREIGN PATENT DOCUMENTS

| CN | 10145215 A | 4/2009 |
| CN | 101730129 A | 6/2010 |
| CN | 101765122 A | 6/2010 |
| GB | 2469027 A | 10/2010 |

OTHER PUBLICATIONS

International Search Report and Written Opinion—PCT/US2011/025112, International Search Authority—European Patent Office—Sep. 20, 2011.
Taiwan Search Report—TW100105424—TIPO—Jul. 31, 2013.

* cited by examiner

*Primary Examiner* — Alex Skripnikov
(74) *Attorney, Agent, or Firm* — Kristine U. Ekwueme

(57) ABSTRACT

Certain aspects of the present disclosure propose techniques for enhancing a measurement gap for TD-SCDMA measurement. Certain aspects provide a method that generally includes receiving, from a base station (BS) of a first radio access technology (RAT), a message indicating a measurement gap in which a user equipment (UE) is to take a measurement in a second RAT, the message comprising an indication of a start position of the measurement gap and a duration of the measurement gap; and taking a measurement during the measurement gap.

68 Claims, 8 Drawing Sheets

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

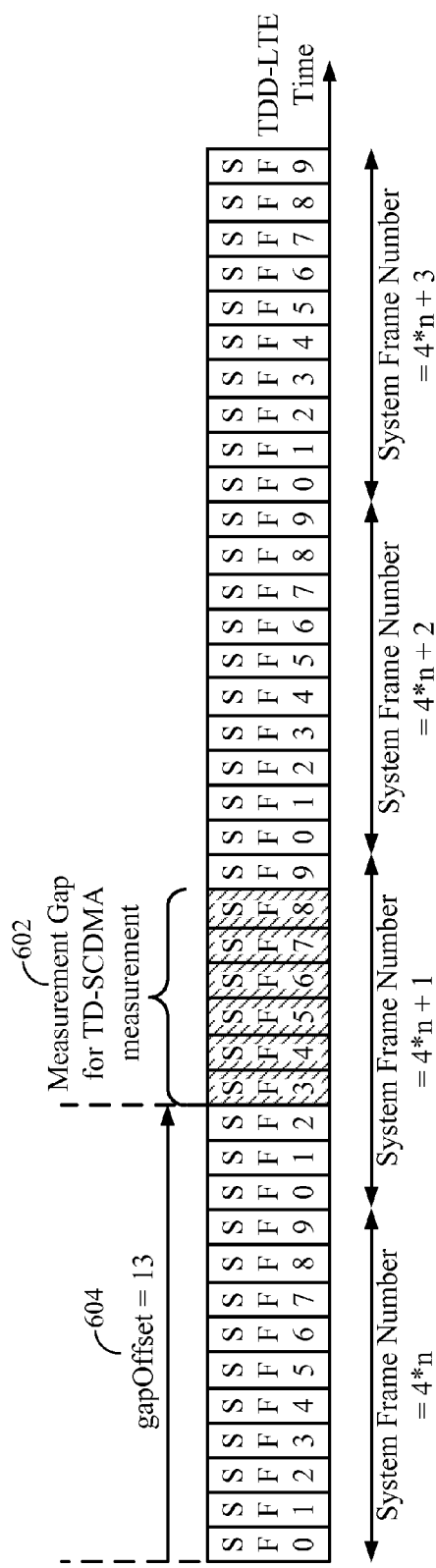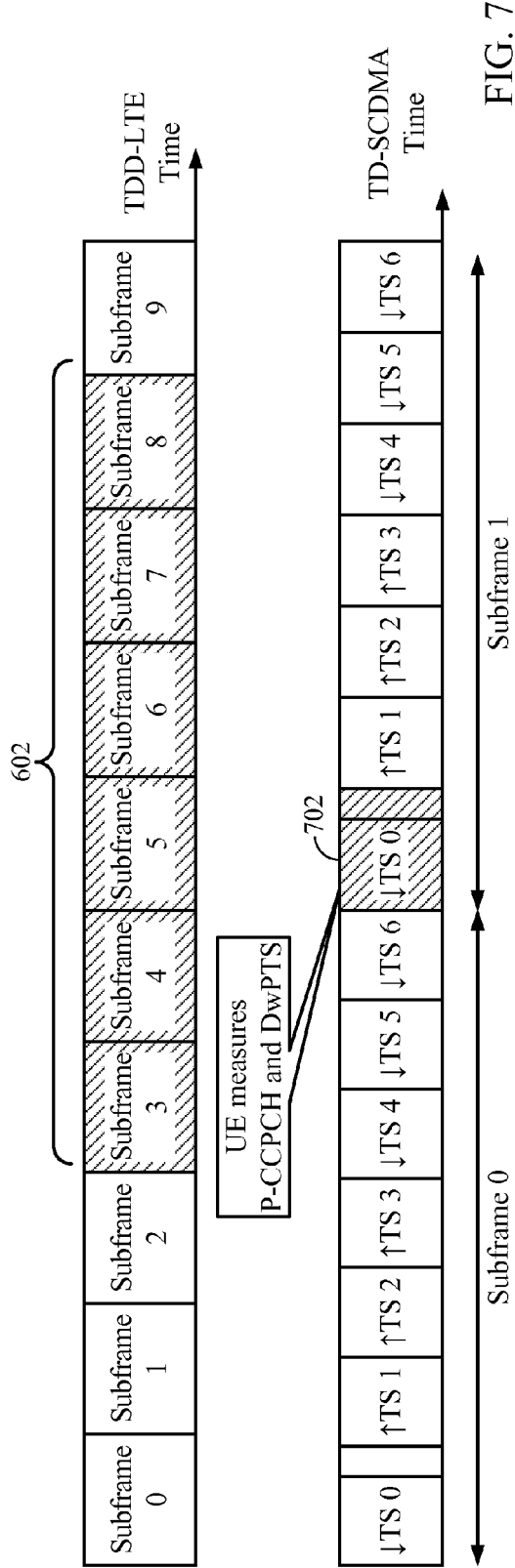

TDD-LTE MEASUREMENT GAP FOR PERFORMING TD-SCDMA MEASUREMENT

BACKGROUND

1. Field

Certain aspects of the present disclosure generally relate to wireless communications and, more particularly, to performing time division synchronous code division multiple access (TD-SCDMA) measurement using a smaller time division duplex-long term evolution (TDD-LTE) transmission gap.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communications is provided. The method generally includes generating, by a base station (BS) of a first radio access technology (RAT), a message to a user equipment (UE) indicating a measurement gap in which the UE is to take a measurement in a second RAT, the message comprising an indication of a start position of the measurement gap and a duration of the measurement gap; and transmitting the message to the UE.

In as aspect of the disclosure, an apparatus for wireless communications is provided. The apparatus generally includes means for receiving, from a base station (BS) of a first radio access technology (RAT), a message indicating a measurement gap in which a user equipment (UE) is to take a measurement in a second RAT, the message comprising an indication of a start position of the measurement gap and a duration of the measurement gap; and means for taking a measurement during the measurement gap.

In an aspect of the disclosure, an apparatus for wireless communications is provided. The apparatus generally includes at least one processor and a memory coupled to the at least one processor. The at least one processor is typically adapted to receive, from a base station (BS) of a first radio access technology (RAT), a message indicating a measurement gap in which a user equipment (UE) is to take a measurement in a second RAT, the message comprising an indication of a start position of the measurement gap and a duration of the measurement gap; and take a measurement during the measurement gap.

In an aspect of the disclosure, a computer-program product is provided. The computer-program product generally includes a computer-readable medium having code for receiving, from a base station (BS) of a first radio access technology (RAT), a message indicating a measurement gap in which a user equipment (UE) is to take a measurement in a second RAT, the message comprising an indication of a start position of the measurement gap and a duration of the measurement gap; and taking a measurement during the measurement gap.

In an aspect of the disclosure, a method for wireless communications is provided. The method generally includes receiving, from a base station (BS) of a first radio access technology (RAT), a message indicating a measurement gap in which a user equipment (UE) is to take a measurement in a second RAT, the message comprising an indication of a start position of the measurement gap and a duration of the measurement gap; and taking a measurement during the measurement gap.

In an aspect of the disclosure, an apparatus for wireless communications is provided. The apparatus generally includes means for generating, by a base station (BS) of a first radio access technology (RAT), a message to a user equipment (UE) indicating a measurement gap in which the UE is to take a measurement in a second RAT, the message comprising an indication of a start position of the measurement gap and a duration of the measurement gap; and means for transmitting the message to the UE.

In an aspect of the disclosure, an apparatus for wireless communications is provided. The apparatus generally includes at least one processor and a memory coupled to the at least one processor. The at least one processor is typically adapted to generate, by a base station (BS) of a first radio access technology (RAT), a message to a user equipment (UE) indicating a measurement gap in which the UE is to take a measurement in a second RAT, the message comprising an indication of a start position of the measurement gap and a duration of the measurement gap; and transmit the message to the UE.

In an aspect of the disclosure, a computer-program product is provided. The computer-program product generally includes a computer-readable medium having code for generating, by a base station (BS) of a first radio access technology (RAT), a message to a user equipment (UE) indicating a measurement gap in which the UE is to take a measurement in a second RAT, the message comprising an indication of a start position of the measurement gap and a duration of the measurement gap; and transmitting the message to the UE.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 5 illustrates an example list of downlink/uplink (DL/UL) configurations in a frame in the TDD-LTE standard in accordance with certain aspects of the present disclosure.

FIG. 6 illustrates an embodiment of a measurement gap in TDD-LTE in accordance with certain aspects of the present disclosure.

FIG. 7 illustrates the measurement gap of FIG. 6 for performing a TD-SCDMA measurement in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
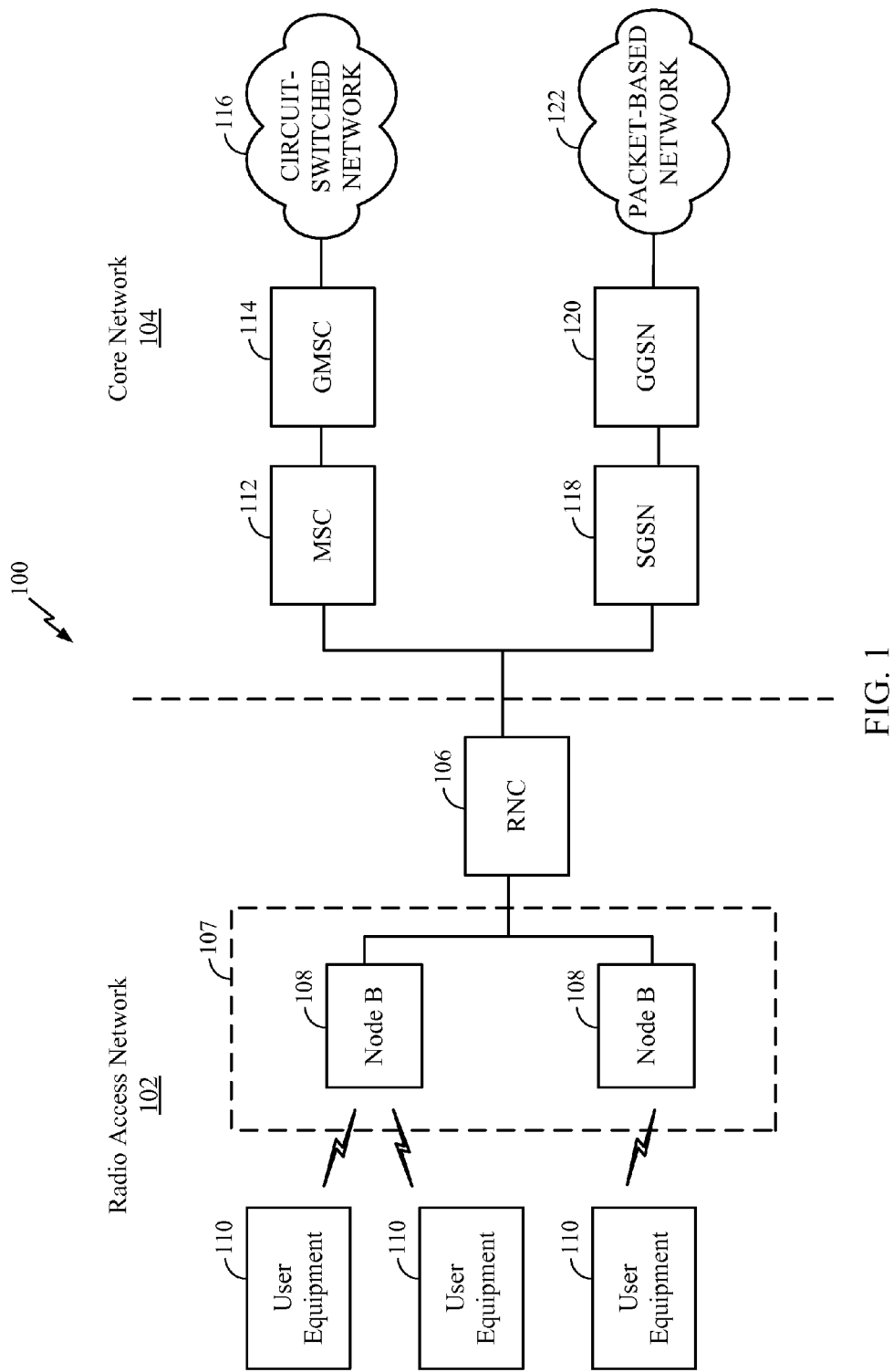
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine a location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
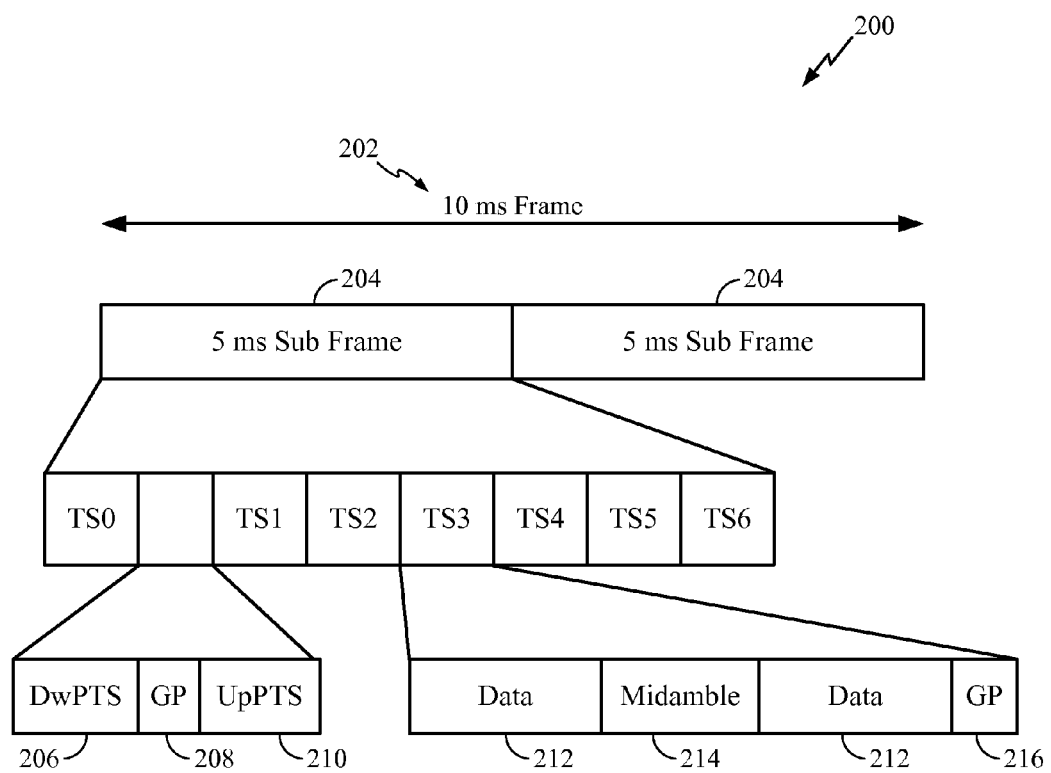
FIG. 2 is a block diagram conceptually illustrating an example of a frame structure in a telecommunications system in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. In TS0, a primary common control physical channel (P-CCPCH) may be transmitted by a base station (BS). The P-CCPCH may use the first two code channels in TS0 of each subframe 204. To measure the TD-SCDMA carrier, a user equipment (UE) may need to acquire the timing of the subframe 204, acquire DwPTS, and measure the received signal code power (RSCP) of P-CCPCH.

Figure 3:
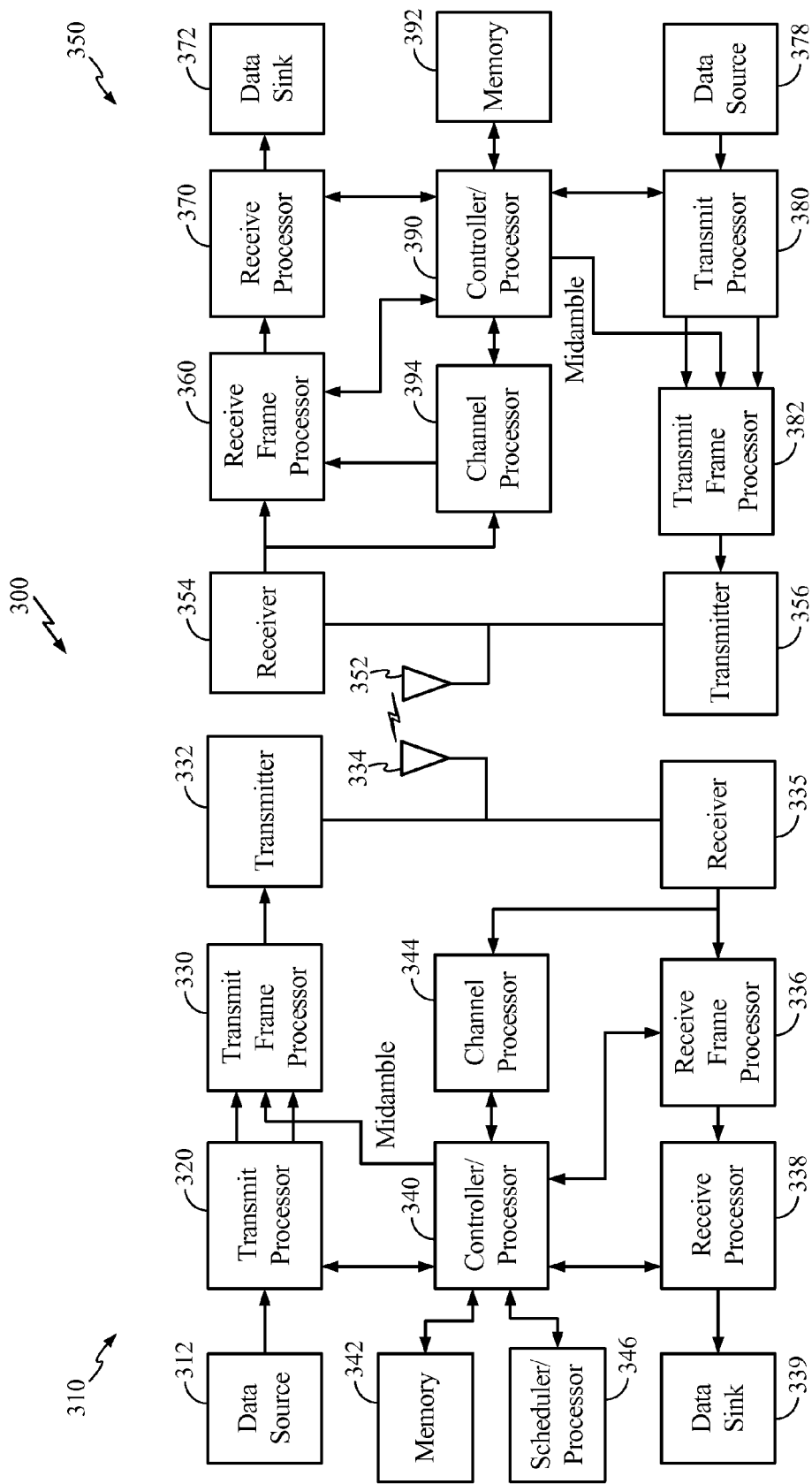
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM) and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Figure 4:
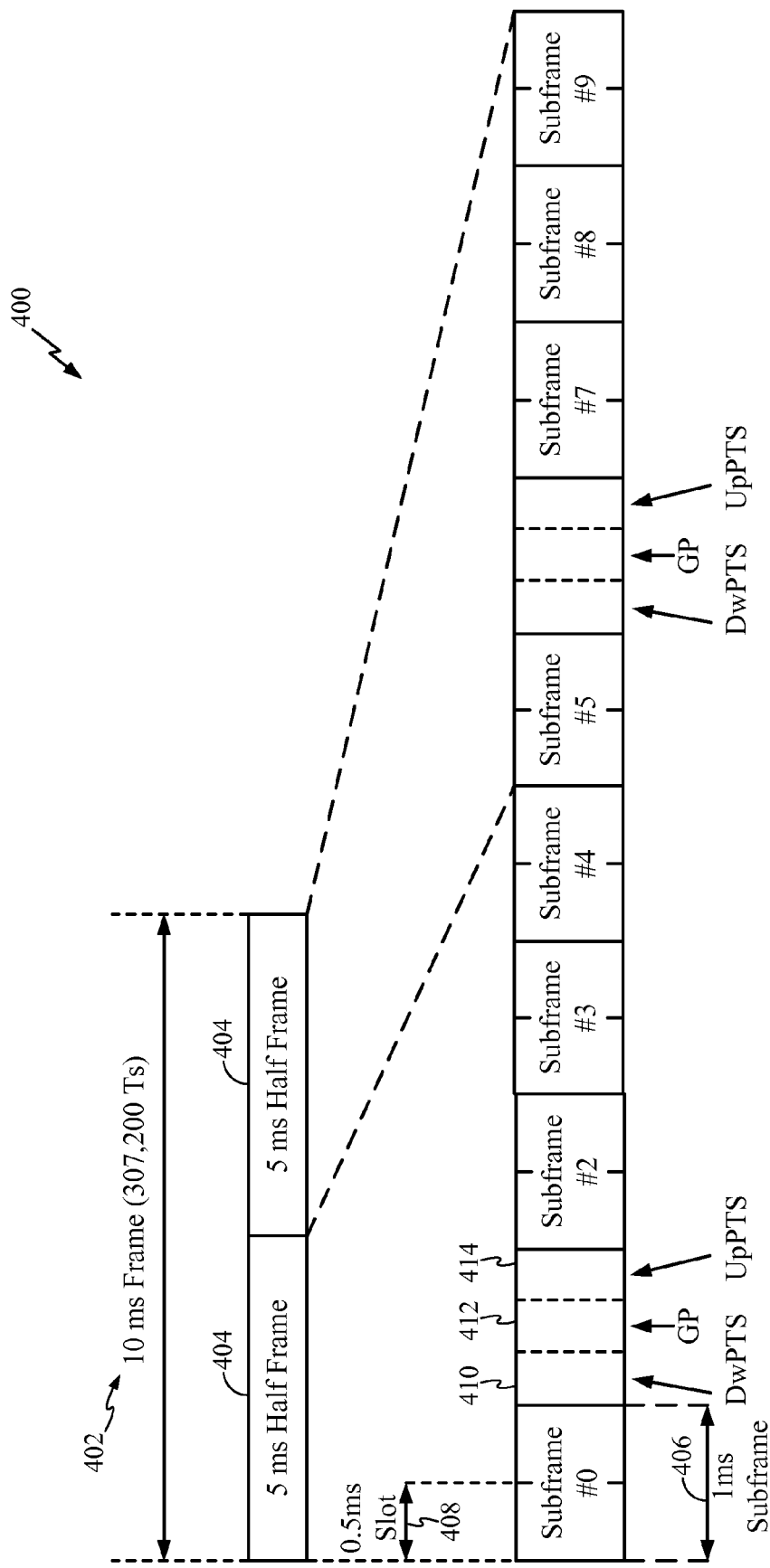
FIG. 4 is a block diagram conceptually illustrating an example of a frame structure in a telecommunications system in accordance with certain aspects of the present disclosure.

FIG. 4 shows a frame structure 400 for a Time Division Duplex Long Term Evolution (TDD-LTE) carrier. The TDD-LTE carrier, as illustrated, has a frame 402 that is 10 ms in length. The frame 402 has two 5 ms half frames 404, and each of the half frames 404 includes five 1 ms subframes 406. Each subframe 406 may be a downlink subframe (D), an uplink subframe (U), or a special subframe (S). Downlink subframes and uplink subframes may be divided into two 0.5 ms slots 408. Special subframes may be divided into a downlink pilot time slot (DwPTS) 410, a guard period (GP) 412, and an uplink pilot time slot (UpPTS) 414. Depending on the configuration, the duration of DwPTS, UpPTS, and GP may vary.

FIG. 5 illustrates an example list of the downlink/uplink configurations in a TDD-LTE frame 402 according to the LTE standard. In this table D, U, and S indicate Downlink, Uplink and Special subframes 406, respectively. The special subframe S may consist of DwPTS 410, GP 412, and UpPTS 414 fields. As illustrated, several DL/UL configurations for 5 ms switch point periodicity and 10 ms switch point periodicity may be chosen for a TDD-LTE frame 402. The configurations 0, 1, and 2 have two identical 5 ms half-frames 404 within a 10 ms TDD-LTE frame 402.

A Method of Enhancing TDD-LTE Measurement Gap for Performing TD-SCDMA Measurement To allow inter-RAT measurement, a base station (BS) may provide a measurement gap in a RRCConnectionReconfiguration message. The measurement gap may be parameterized by a 6 ms gap per 40 ms or 80 ms time period. During the 6 ms time duration, a UE may tune to another radio access technology (RAT) (e.g., TD-SCDMA) and perform a measurement.

FIG. 6 illustrates an example of a 6 ms measurement gap 602 for performing a TD-SCDMA measurement in TDD-LTE according to a 40 ms configuration. The 40 ms configuration may include subframes 0-39 and a gapOffset 604 (e.g., equal to 13 subframes). A measurement gap 602 parameterized by an 80 ms time period may include subframes 0-79. It may be expected that the TDD-LTE system may be deployed in a way that the frame transmission is synchronous for the BS and that the frame boundary may be in sync with the TD-SCDMA system. The measurement gap 602 illustrated in FIG. 6 may be unable to provide an efficient method in synchronous systems, as will be discussed further herein.

FIG. 7 illustrates a TDD-LTE frame comprising the 6 ms measurement gap 602. A UE performing TD-SCDMA measurements during the measurement gap 602 may not need the full 6 ms. Instead, the UE may only need TS0 702 on the second subframe of the TD-SCDMA system to measure P-CCPCH and DwPTS. Accordingly, the remaining time of the measurement gap may be left unused.

Figure 8:
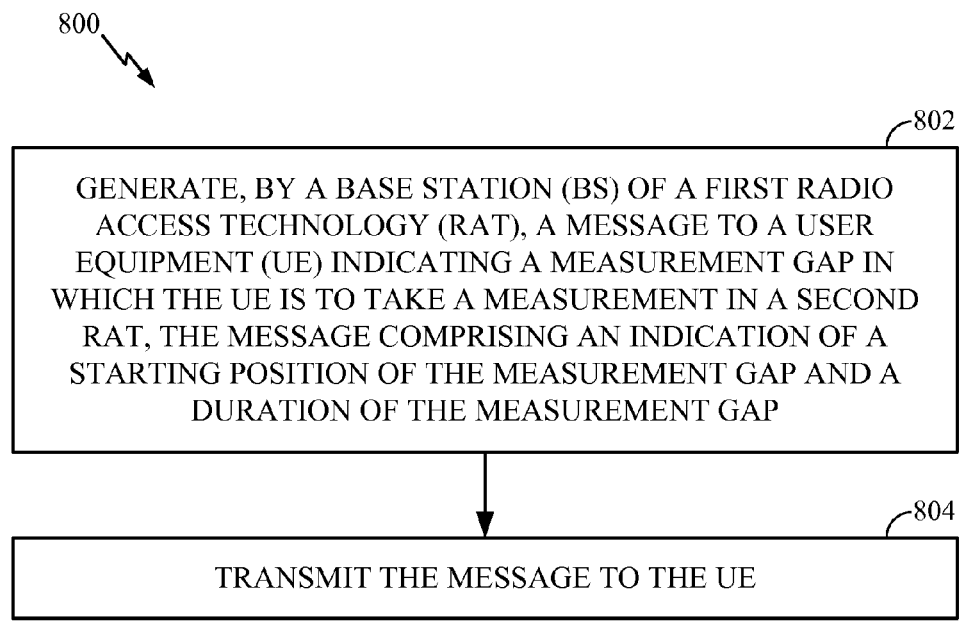
FIG. 8 illustrates example operations for transmitting a message comprising an indication of a start position and duration of a measurement gap, in accordance with certain aspects of the present disclosure.

FIG. 8 illustrates example operations 800 in accordance with certain aspects of the present disclosure. The operations 800 may be performed, for example, by a BS of a first RAT in transmitting a message to a UE. At 802, the BS of the first RAT may generate a message to a UE indicating a measurement gap in which the UE is to take a measurement in a second RAT. The message may comprise an indication of a start position and duration of the measurement gap. For some embodiments, the duration of the measurement gap may be indicated by the start position and an end position. The start position may be at a beginning of a first subframe that is consecutive to a second subframe in which a control channel of the second RAT is transmitted. The end position may be at an end of the second subframe in which the control channel completes transmission. At 804, the BS may transmit the message to the UE.

Figure 9:
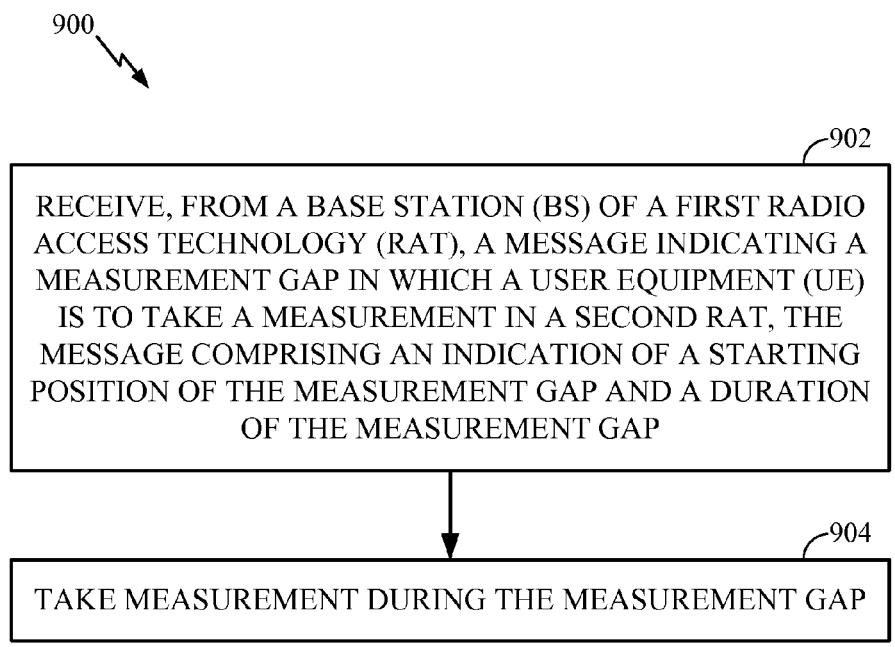
FIG. 9 illustrates example operations for taking a measurement during a measurement gap, in accordance with certain aspects of the present disclosure.

FIG. 9 illustrates example operations 900 in accordance with certain aspects of the present disclosure. The operations 900 may be performed, for example, by a UE in taking measurements during a measurement gap. At 902, the UE may receive from a BS of a first RAT a message indicating a measurement gap in which the UE may take a measurement in a second RAT. The message may comprise an indication of a start position and duration of the measurement gap. At 904, the UE may take a measurement during the measurement gap.

Figures 10, 11:
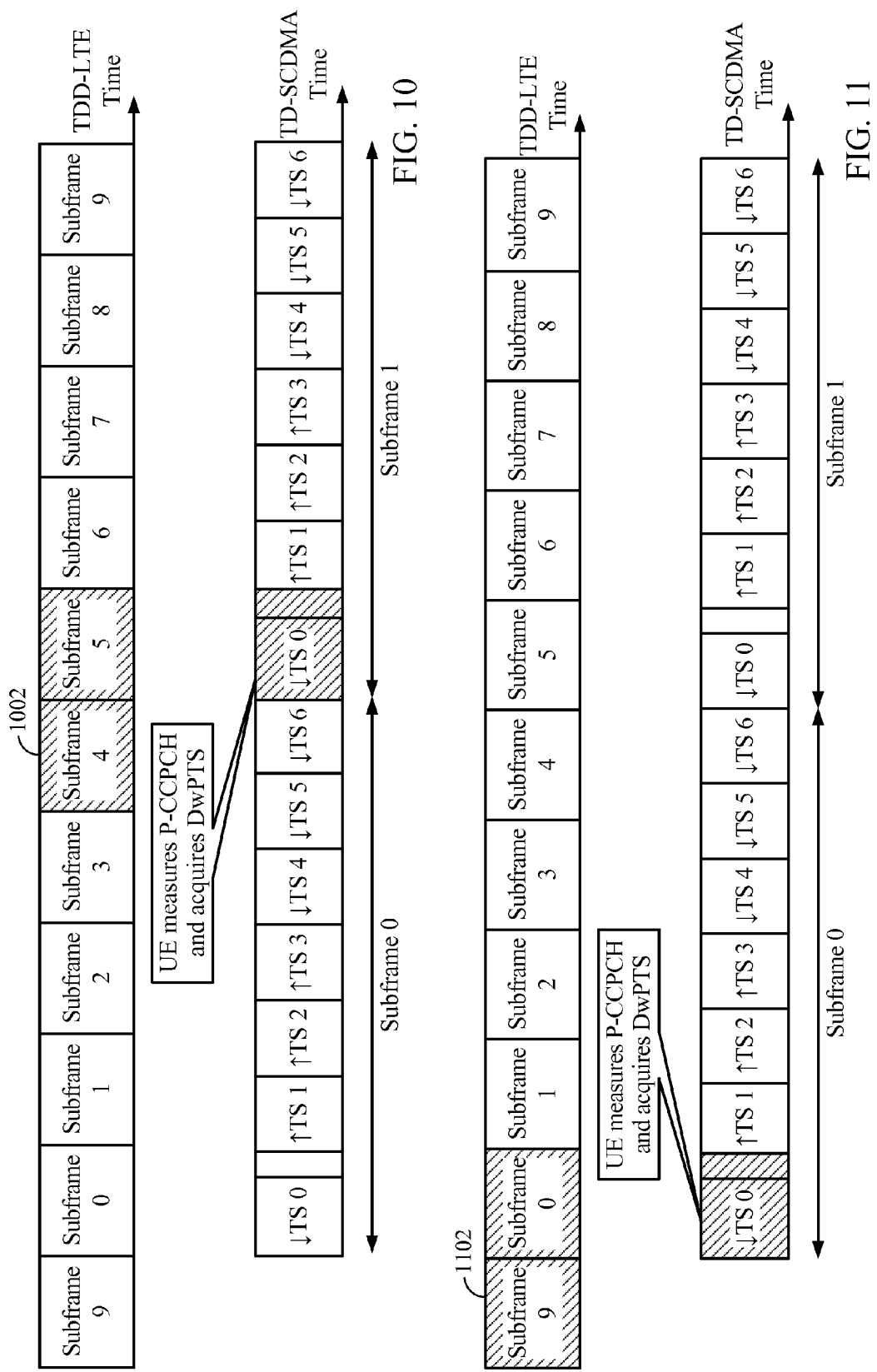
FIGS. 10-11 illustrate example configurations for an enhanced measurement gap of 2 ms, in accordance with certain aspects of the present disclosure.

According to an aspect of the present disclosure, a shorter measurement gap (e.g., 2 ms) may be used instead of a 6 ms gap to allow for a more effective measurement of TD-SCDMA from a TDD-LTE system, as illustrated in FIGS. 10-11. After measuring DwPTS, there may be about 0.2 ms to tune back to TDD-LTE for the next subframe. According to certain aspects, a measurement gap may only start at subframe 4 or subframe 9 to allow the UE to tune to the TD-SCDMA cell. FIG. 10 illustrates a measurement gap starting at subframe 4 1002, and FIG. 11 illustrates a measurement gap starting at subframe 9 1102. Since the measurement gap may only start at subframe 4 or subframe 9, the gapOffset may be positioned for these two subframes. Namely, the gapOffset may only be 4, 9, 14, 19, 24, 29, 34, 39, 44, 49, 54, 59, 64, 69, 74, or 79. Using a shorter measurement gap, for example, of 2 ms, instead of 6 ms may allow the UE to perform a TD-SCDMA measurement using a smaller TDD-LTE transmission gap, which may reduce the throughput loss or data transmission delay during the measurement on TD-SCDMA while in the TDD-LTE system.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communications, comprising:
   receiving, from a base station (BS) of a first radio access technology (RAT), a message indicating a measurement gap in which a user equipment (UE) is to take a measurement in a second RAT, the message comprising an indication of a first subframe for a start position of the measurement gap and a second subframe for an end position of the measurement gap; and
   taking a measurement only during a portion of the measurement gap that is less than a total measurement gap, the portion being determined based at least in part on a timing of the second RAT acquired by the UE.

2. The method of claim 1, wherein a duration of the gap is indicated by the start position and the end position.

3. The method of claim 1, wherein the measurement is taken on a control channel transmitted in the measurement gap.

4. The method of claim 3, wherein the control channel comprises a primary common control physical channel (P-CCPCH).

5. The method of claim 1, wherein the measurement is taken on a downlink pilot time slot (DwPTS) transmitted in the measurement gap.

6. The method of claim 1, wherein the message is a radio resource control (RRC) connection reconfiguration message.

7. The method of claim 1, wherein the first RAT comprises Time Division Duplex Long Term Evolution (TDD-LTE).

8. The method of claim 1, wherein the second RAT comprises Time Division Synchronous Code Division Multiple Access (TD-SCDMA).

9. An apparatus for wireless communications, comprising:
   means for receiving, from a base station (BS) of a first radio access technology (RAT), a message indicating a measurement gap in which a user equipment (UE) is to take a measurement in a second RAT, the message comprising an indication of a first subframe for a start position of the measurement gap and a second subframe for an end position of the measurement gap; and means for taking a measurement only during a portion of the measurement gap that is less than a total measurement gap, the portion being determined based at least in part on a timing of the second RAT acquired by the UE.

10. The apparatus of claim 9, wherein a duration of the gap is indicated by the start position and the end position.

11. The apparatus of claim 9, wherein the measurement is taken on a control channel transmitted in the measurement gap.

12. The apparatus of claim 11, wherein the control channel comprises a primary common control physical channel (P-CCPCH).

13. The apparatus of claim 9, wherein the measurement is taken on a downlink pilot time slot (DwPTS) transmitted in the measurement gap.

14. The apparatus of claim 9, wherein the message is a radio resource control (RRC) connection reconfiguration message.

15. The apparatus of claim 9, wherein the first RAT comprises Time Division Duplex Long Term Evolution (TDD-LTE).

16. The apparatus of claim 9, wherein the second RAT comprises Time Division Synchronous Code Division Multiple Access (TD-SCDMA).

17. An apparatus for wireless communications, comprising:
at least one processor adapted to:
receive, from a base station (BS) of a first radio access technology (RAT), a message indicating a measurement gap in which a user equipment (UE) is to take a measurement in a second RAT, the message comprising an indication of a first subframe for a start position of the measurement gap and a second subframe for an end position of the measurement gap; and
take a measurement only during a portion of the measurement gap that is less than a total measurement gap, the portion being determined based at least in part on a timing of the second RAT acquired by the UE; and
a memory coupled to the at least one processor.

18. The apparatus of claim 17, wherein a duration of the gap is indicated by the start position and the end position.

19. The apparatus of claim 17, wherein the measurement is taken on a control channel transmitted in the measurement gap.

20. The apparatus of claim 19, wherein the control channel comprises a primary common control physical channel (P-CCPCH).

21. The apparatus of claim 17, wherein the measurement is taken on a downlink pilot time slot (DwPTS) transmitted in the measurement gap.

22. The apparatus of claim 17, wherein the message is a radio resource control (RRC) connection reconfiguration message.

23. The apparatus of claim 17, wherein the first RAT comprises Time Division Duplex Long Term Evolution (TDD-LTE).

24. The apparatus of claim 17, wherein the second RAT comprises Time Division Synchronous Code Division Multiple Access (TD-SCDMA).

25. A computer-program product, comprising:
a non-transitory computer-readable medium comprising code for:
receiving, from a base station (BS) of a first radio access technology (RAT), a message indicating a measurement gap in which a user equipment (UE) is to take a measurement in a second RAT, the message comprising an indication of a first subframe for a start position of the measurement gap and a second subframe for an end position of the measurement gap; and
taking a measurement only during a portion of the measurement gap that is less than a total measurement gap, the portion being determined based at least in part on a timing of the second RAT acquired by the UE.

26. The computer-program of claim 25, wherein a duration of the gap is indicated by the start position and the end position.

27. The computer-program of claim 25, wherein the measurement is taken on a control channel transmitted in the measurement gap.

28. The computer-program of claim 27, wherein the control channel comprises a primary common control physical channel (P-CCPCH).

29. The computer-program of claim 25, wherein the measurement is taken on a downlink pilot time slot (DwPTS) transmitted in the measurement gap.

30. The computer-program of claim 25, wherein the message is a radio resource control (RRC) connection reconfiguration message.

31. The computer-program of claim 25, wherein the first RAT comprises Time Division Duplex Long Term Evolution (TDD-LTE).

32. The computer-program of claim 25, wherein the second RAT comprises Time Division Synchronous Code Division Multiple Access (TD-SCDMA).

33. A method for wireless communications, comprising:
generating, by a base station (BS) of a first radio access technology (RAT), a message to a user equipment (UE) indicating a measurement gap in which the UE is to take a measurement in a second RAT, the message comprising an indication of a first subframe for a start position of the measurement gap and a second subframe for an end position of the measurement gap; and
transmitting the message to the UE, the UE taking the measurement only during a portion of the measurement gap that is less than a total measurement gap, the portion being determined based at least in part on a timing of the second RAT acquired by the UE.

34. The method of claim 33, wherein a duration of the gap is indicated by the start position and the end position.

35. The method of claim 34, wherein the start position and the duration of the measurement gap is determined such that a downlink pilot time slot (DwPTS) is transmitted in the measurement gap.

36. The method of claim 33, wherein the start position is at a beginning of the first subframe that is consecutive to the second subframe in which a control channel is transmitted.

37. The method of claim 36, wherein the end position is at an end of the second subframe.

38. The method of claim 36, wherein the control channel comprises a primary common control physical channel (P-CCPCH).

39. The method of claim 33, wherein the message is a radio resource control (RRC) connection reconfiguration message.

40. The method of claim 33, wherein the first RAT comprises Time Division Duplex Long Term Evolution (TDD-LTE).

41. The method of claim 33, wherein the second RAT comprises Time Division Synchronous Code Division Multiple Access (TD-SCDMA).

42. An apparatus for wireless communications, comprising:
    means for generating, by a base station (BS) of a first radio access technology (RAT), a message to a user equipment (UE) indicating a measurement gap in which the UE is to take a measurement in a second RAT, the message comprising an indication of a first subframe for a start position of the measurement gap and a second subframe for an end position of the measurement gap; and
    means for transmitting the message to the UE, the UE taking the measurement only during a portion of the measurement gap that is less than a total measurement gap, the portion being determined based at least in part on a timing of the second RAT acquired by the UE.

43. The apparatus of claim 42, wherein a duration of the gap is indicated by the start position and the end position.

44. The apparatus of claim 43, wherein the start position and the duration of the measurement gap is determined such that a downlink pilot time slot (DwPTS) is transmitted in the measurement gap.

45. The apparatus of claim 42, wherein the start position is at a beginning of the first subframe that is consecutive to the second subframe in which a control channel is transmitted.

46. The apparatus of claim 45, wherein the end position is at an end of the second subframe.

47. The apparatus of claim 45, wherein the control channel comprises a primary common control physical channel (P-CCPCH).

48. The apparatus of claim 42, wherein the message is a radio resource control (RRC) connection reconfiguration message.

49. The apparatus of claim 42, wherein the first RAT comprises Time Division Duplex Long Term Evolution (TDD-LTE).

50. The apparatus of claim 42, wherein the second RAT comprises Time Division Synchronous Code Division Multiple Access (TD-SCDMA).

51. An apparatus for wireless communications, comprising:
    at least one processor adapted to:
        generate, by a base station (BS) of a first radio access technology (RAT), a message to a user equipment (UE) indicating a measurement gap in which the UE is to take a measurement in a second RAT, the message comprising an indication of a first subframe for a start position of the measurement gap and a second subframe for an end position of the measurement gap; and
        transmit the message to the UE, the UE taking the measurement only during a portion of the measurement gap that is less than a total measurement gap, the portion being determined based at least in part on a timing of the second RAT acquired by the UE; and
    a memory coupled to the at least one processor.

52. The apparatus of claim 51, wherein a duration of the gap is indicated by the start position and the end position.

53. The apparatus of claim 52, wherein the start position and the duration of the measurement gap is determined such that a downlink pilot time slot (DwPTS) is transmitted in the measurement gap.

54. The apparatus of claim 51, wherein the start position is at a beginning of the first subframe that is consecutive to the second subframe in which a control channel is transmitted.

55. The apparatus of claim 54, wherein the end position is at an end of the second subframe.

56. The apparatus of claim 54, wherein the control channel comprises a primary common control physical channel (P-CCPCH).

57. The apparatus of claim 51, wherein the message is a radio resource control (RRC) connection reconfiguration message.

58. The apparatus of claim 51, wherein the first RAT comprises Time Division Duplex Long Term Evolution (TDD-LTE).

59. The apparatus of claim 51, wherein the second RAT comprises Time Division Synchronous Code Division Multiple Access (TD-SCDMA).

60. A computer-program product, comprising:
    a non-transitory computer readable medium comprising code for:
        generating, by a base station (BS) of a first radio access technology (RAT), a message to a user equipment (UE) indicating a measurement gap in which the UE is to take a measurement in a second RAT, the message comprising an indication of a first subframe for a start position of the measurement gap and a second subframe for an end position of the measurement gap; and
        transmitting the message to the UE, the UE taking the measurement only during a portion of the measurement gap that is less than a total measurement gap, the portion being determined based at least in part on a timing of the second RAT acquired by the UE.

61. The computer-program product of claim 60, wherein a duration of the gap is indicated by the start position and the end position.

62. The computer-program product of claim 61, wherein the start position and the duration of the measurement gap is determined such that a downlink pilot time slot (DwPTS) is transmitted in the measurement gap.

63. The computer-program product of claim 60, wherein the start position is at a beginning of the first subframe that is consecutive to the second subframe in which a control channel is transmitted.

64. The computer-program product of claim 63, wherein the end position is at an end of the second subframe.

65. The computer-program product of claim 63, wherein the control channel comprises a primary common control physical channel (P-CCPCH).

66. The computer-program product of claim 60, wherein the message is a radio resource control (RRC) connection reconfiguration message.

67. The computer-program product of claim 60, wherein the first RAT comprises Time Division Duplex Long Term Evolution (TDD-LTE).

68. The computer-program product of claim 60, wherein the second RAT comprises Time Division Synchronous Code Division Multiple Access (TD-SCDMA).

* * * * *